US006850972B1

(12) United States Patent
Itoh

(10) Patent No.: US 6,850,972 B1
(45) Date of Patent: Feb. 1, 2005

(54) IMAGE TRANSFER SYSTEM AND IMAGE TRANSFER METHOD

(75) Inventor: Shin-ichi Itoh, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/578,713

(22) Filed: May 26, 2000

(30) Foreign Application Priority Data

May 27, 1999 (JP) .......................................... 11-148202

(51) Int. Cl.[7] ............................................. G06F 15/16
(52) U.S. Cl. ....................... 709/219; 709/201; 709/203; 709/217
(58) Field of Search ............................... 709/201, 203, 709/217, 219

(56) References Cited

U.S. PATENT DOCUMENTS

| | | | | |
|---|---|---|---|---|
| 5,937,164 A | * | 8/1999 | Mages et al. ................ | 709/218 |
| 6,230,189 B1 | * | 5/2001 | Sato et al. ................... | 709/206 |
| 6,256,662 B1 | * | 7/2001 | Lo et al. ...................... | 709/203 |
| 6,288,799 B1 | * | 9/2001 | Sekiguchi .................... | 358/468 |
| 6,404,762 B1 | * | 6/2002 | Luzeski et al. .............. | 370/352 |

FOREIGN PATENT DOCUMENTS

| JP | 10-150462 | 6/1998 |
|---|---|---|
| JP | 10-326288 | 12/1998 |

* cited by examiner

Primary Examiner—Rupal Dharia
Assistant Examiner—April Baugh
(74) Attorney, Agent, or Firm—Foley & Lardner LLP

(57) ABSTRACT

The invention provides an image transfer system and method by which image data stored in accordance with a coding method in a facsimile apparatus connected to a network, can be outputted to a terminal equipment connected to the network. A WWW browser is initiated in the terminal equipment and sends an acquisition request for HTML document to the facsimile apparatus. In the facsimile apparatus, the acquisition notification is detected by a request analysis section through a HTTP request reception section, and a HTML document is transmitted from a HTML signaling section to the terminal equipment. The terminal equipment finds, when the HTML document which includes an acquisition request for a coding program is displayed, the request and issues an acquisition rest for a decoding program. The request analysis section of the facsimile apparatus detects the request, and a program signaling section transmits the decoding program to the terminal equipment. The decoding program includes a description for request for image data and issues, when executed, an acquisition request for image data. The request is detected by the request analysis section, and an image data signaling section acquires image data stored in an image storage section and transmits the image data. The image data is received and decoded by the terminal equipment so that it is converted into data of a format for display, and the data is displayed on a display unit.

9 Claims, 13 Drawing Sheets

FIG.6

```
<HTML>
<HEAD>
<TITLE>FAX VIEW HOME PAGE </TITLE>
</HEAD>
<BODY>
<H2>LIST OF FACSIMILE RECEIVED DOCUMENTS</H2><BR>
<HR>
<BR>
<TABLE BORDER>
<TR>
<TD><H3>JANUARY 10, 1999</H3></TD>
<TD><H3>10:00</H3></TD>
<TD><H3>BEPPU SPA ASSOCIATION</H3></TD>
<TD><H3>3 PAGES</H3></TD>
<TD><H3>
<A HREF="/0001-0001-view.html">1</A>
<A HREF="/0001-0002-view.html">2</A>
<A HREF="/0001-0003-view.html">3</A>
</H3></TD></TR>
<TR>
<TD><H3>JANUARY 20, 1999</H3></TD>
<TD><H3>16:00</H3></TD>
<TD><H3>TAKACHIHO/KYO SIGHTSEEING</H3></TD>
<TD><H3>4 PAGES</H3></TD>
<TD><H3>
<A HREF="/0002-0001-view.html">1</A>
<A HREF="/0002-0002-view.html">2</A>
<A HREF="/0002-0003-view.html">3</A>
<A HREF="/0002-0004-view.html">4</A>
</H3></TD></TR>
```

```
<TR>
<TD><H3>JANUARY 30, 1999</H3></TD>
<TD><H3>12:00</H3></TD>
<TD><H3>AOSHIMA GYOGYO</H3></TD>
<TD><H3>1 PAGE</H3></TD>
<TD><H3>
<A HREF="/0003-0001-view.html">1</A>
</H3></TD></TR>
<TR>
<TD><H3>FEBRUARY 3, 1999</H3></TD>
<TD><H3>08:00</H3></TD>
<TD><H3>IBUSUKI HOTEL GUILD</H3></TD>
<TD><H3>2 PAGES</H3></TD>
<TD><H3>
<A HREF="/0004-0001-view.html">1</A>
<A HREF="/0004-0002-view.html">2</A>
</H3></TD></TR>
<TR>
<TD><H3>FEBRUARY 5, 1999</H3></TD>
<TD><H3>14:00</H3></TD>
<TD><H3>KIRISHIMA SPA GUILD</H3></TD>
<TD><H3>5 PAGES</H3></TD>
<TD><H3>
<A HREF="/0005-0001-view.html">1</A>
<A HREF="/0005-0002-view.html">2</A>
<A HREF="/0005-0003-view.html">3</A>
<A HREF="/0005-0004-view.html">4</A>
<A HREF="/0005-0005-view.html">5</A>
</H3></TD></TD>

</TABLE>
</BODY>
</HTML>
```

FIG.7

LIST OF FACSIMILE RECEIVED DOCUMENTS

| JANUARY 10, 1999 | 10:00 | BEPPU SPA ASSOCIATION | 3 PAGES | 1 2 3 |
| JANUARY 20, 1999 | 16:30 | TAKACHIHOKYO SIGHTSEEING | 4 PAGES | 1 2 3 4 |
| JANUARY 30, 1999 | 12:00 | AOSHIMA GYOGYO | 1 PAGES | 1 |
| FEBRUARY 3, 1999 | 08:20 | IBUSUKI HOTEL GUILD | 2 PAGES | 1 2 |
| FEBRUARY 5, 1999 | 14:21 | KIRISHIMA SPA GUILD | 5 PAGES | 1 2 3 4 5 |

FIG.8

```
<HTML>
<HEAD>
<TITLE>FAX VIEW PAGE</TITLE>
</HEAD>
<BODY>
The following is FAX received pages.
<APPLET
 CODE= "view class"
 CODEBASE= "/"
 NAME=view
 WIDTH=1728
 HEIGHT=2000>
<PARAM NAME=docNumber VALUE=XXXX>
<PARAM NAME=pageNumber VALUE=YYYY>
</APPLET>
</BODY>
</HTML>
```

FIG.9

```
import java.awt.*;
import java.applet.*;
import java.net.*;
import java.io.*;
import java.awt.image.*;

public class view extends Applet
{
 Image img;

/* init method. Called only once when applet is loaded. */
public void init() {
  /* Acquire document number and page number from parameters.*/
  int docNumber=Integer.parseInt(getParameter("docNumber"));
  int pageNumber=Integer.parseInt(getParameter("pageNumber"));

/* Produce file name /XXXX-YYYY-pix.data from document number and page number */
  String filename
  =String.valueOf(docNumber)+"-"+String.valueOf(pageNumber)+"-"+pix.data";

/* Connect to facsimile apparatus and request for and acquire image data /XXXX-YYYY
  -pix.data */
  int pixData[ ]=new int [1728*2000/8];
  int pixDataMax=0;
  txy{
    URL url=new URL(getCodeBase(),filename);
    URLConnection urlCon=url.openConnection();
    BufferedReader bufr =
      new bufferedReader(new InputStreamReader(urlCon.getInputStream()));
    int c; while ((c=bufr.read ())!=-1) pixData[pixDataMax++]=c;
    bufr.close();
  }catch(java.io.IOException ex){
    ex.printStrack Trace();
  }

/* Decode with known coding method to produce decoded image */
  DecodeImage(pixData, pixDataMax);
  img=createImage(new MemoryImage Source (1728,2000,pixData,0,1728))
 }

/* paint method. Called from Java system when plotting is required. */
public void paint(Graphics g){
  /* Display of decoded image */
  g.drewImago(img,0,0,this);
  }
 }
```

FIG.13

```
<HTML>
<HEAD>
<TITLE>FAX VIEW PAGE</TITLE>
</HEAD>
<BODY>
The following is FAX received pages.
<APPLET
  CODE= "view_class"
  CODEBASE= "http://applet.server.or.jp"
  NAME=view
  WIDTH=1728
  HEIGHT=2000>
<PARAM NAME=docNumber VALUE=XXXX>
<PARAM NAME=pageNumber VALUE=YYYY>
</APPLET>
</BODY>
</HTML>
```

IMAGE TRANSFER SYSTEM AND IMAGE TRANSFER METHOD

BACKGROUND OF THE INVENTION

1. Field of the Invention

The present invention relates to an image transfer system and an image transfer method, and more particularly to an image transfer system and an image transfer method wherein an image is transferred over a network.

2. Description of the Related Art

Various facsimile apparatus are conventionally known, and as one of such facsimile apparatus, a facsimile server is disclosed in Japanese Patent Laid-Open No. Hei 10-150462. The facsimile server converts received image data into data of the GIF (Graphics Interchange Format) format or the JPEG (Joint Photographic Coding Experts Group) format in the inside of the facsimile apparatus and offers the data as a HTML (Hyper Text Makeup Language) document so that it can be read using a WWW (World Wide Web) browser thereby to realize image outputting seamlessly without requiring a special application.

Meanwhile, an image information inputting/outputting apparatus is disclosed in Japanese Patent Laid-Open No. Hei 10-326288. The image information inputting/outputting apparatus includes a web browser provided in a scanner apparatus and including a management table in which URLs (Uniform Resource Locators) and set values are stored in a coordinated relationship, and a URL interpretation section for interpreting a URL. A URL inputted from a web browser of an information terminal is converted into a sat value by the URL interpretation section. The set value obtained by the conversion is set to a driving control section by a setting section, and an image is read in by the driving control section in accordance with a desired reading condition. Accordingly, operation of an image information inputting/outputting apparatus is realized seamlessly under unified environments.

However, the facsimile server and the image information inputting/outputting apparatus have the following problems.

The first problem is that a hardware resource for image conversion is required. The reason is that, while usually a facsimile apparatus holds a stored image in a coded form for saving its capacity, since it is not designed so that it can be utilized only by a terminal or an output destination, such a coding method that data obtained by the coding method can be decoded by the output destination terminal may not necessarily be adopted by the facsimile apparatus. Accordingly, in the case just described, image conversion must be performed so that the image can be utilized by the output destination terminal. However, in order to realize this, hardware resources such as a CPU and a memory must be used.

The second problem is that an unnecessary load is applied to the network. The reason is that, while usually most of images received by a facsimile apparatus are binary images of white and black, an image format wherein colors are taken into consideration is sometimes used by a terminal of an output destination. To convert a binary image into an image of a color format in order to allow handling of such a binary image is to make the information redundant, and transfer of an image obtained by such conversion applies an useless load to the network.

SUMMARY OF THE INVENTION

It is an object of the present invention to provide an image transfer system and an image transfer method by which image data stored in accordance with a coding system in a facsimile apparatus connected to a network can be outputted to a terminal equipment connected to the same network such as a personal computer or a work station.

It is another object of the present invention to provide an image transfer system and an image transfer method by which image outputting can be realized seamlessly under unified operation environments without installing a driver for exclusive use in a terminal equipment of an outputting destination.

It is a further object of the present invention to provide an image transfer system and an image transfer method wherein conversion of image data into data of a format which can be used by a terminal equipment can be performed efficiently without using a hardware resource in a facsimile apparatus such as a CPU or a RAM.

In order to attain the objects described above, according to an aspect of the present invention, there is provided an image transfer system, comprising one or more terminal equipments, one or more facsimile apparatus, and a network for interconnecting the terminal equipments and the facsimile apparatus, each of the facsimile apparatus including coding means for coding image data included in data inputted to the facsimile apparatus from the outside in accordance with a unique coding method, image data storage means for storing the image data coded by the coding means, and decoding program signaling means for outputting, when the image data stored in the image data storage means is to be outputted to an arbitrary one of the terminal equipments, a decoding program for decoding image data coded in accordance with the coding method in response to an acquisition request from the terminal equipment.

Each of the terminal equipments may includes network control means for controlling connection to and data communication with any of the facsimile apparatus over the network, inputting means for inputting an operation instruction to initiate a WWW browser, program execution control means for controlling execution of a program for initiating the WWW browser in response to the operation instruction inputted by the inputting means, and display means for displaying the WWW browser executed by the program execution control means.

According to another aspect of the present invention, there is provided an image transfer system, comprising one or more terminal equipments, one or more facsimile apparatus, and a network for interconnecting the terminal equipments and the facsimile apparatus, each of the facsimile apparatus including coding means for coding image data included in data inputted to the facsimile apparatus over a public network in accordance with a unique coding method, image data storage means for storing the image data coded by the coding means, management means for managing the image data stored in the image data storage means and page information of the image data, network control means for controlling connection to and data communication with any of the terminal equipments over the network, acquisition request reception means for receiving an acquisition request outputted from any of the terminal equipments, acquisition request analysis means for analyzing the acquisition request received by the acquisition request reception means, HTML document data signaling means for signaling, when it is analyzed by the acquisition request analysis means that the acquisition request is an acquisition request for HTML document data, the HTML document data, decoding program signaling means for signaling, when it is analyzed by the acquisition request analysis means that the acquisition request is an acquisition request for a decoding program for decoding image data decoded in accordance with the coding method, image data signaling means for signaling, when it is analyzed by the acquisition request analysis means that the acquisition request is an acquisition request for image data coded in accordance with the coding method, and signaling means for transmitting a response to the acquisition request signaled from one of the HTML document data signaling means, the decoding program signaling means and the image data signaling means to the terminal equipment through the network control means.

According to a further aspect of the present invention, there is provided an image transfer system, comprising one or more terminal equipments, one or more facsimile apparatus, a WWW server, and a network for interconnecting the terminal equipments, the facsimile apparatus and the WWW server, each of the facsimile apparatus including coding means for coding image data included in data inputted to the facsimile apparatus from the outside in accordance with a unique coding method, and image data storage means for storing the image data coded by the coding means, the WWW server including decoding program storage means in which a decoding program for decoding image data coded in accordance with the coding method is stored, and decoding program signaling means for outputting the decoding program in response to a request from the terminal equipment.

Each or the facsimile apparatus may further include management means for managing the image data stored in the image data storage means and page information of the image data, network control means for controlling connection to and data communication with any of the terminal equipments and the WWW server over the network, acquisition request reception means for receiving an acquisition request outputted from any of the terminal equipments, acquisition request analysis means for analyzing the acquisition request received by the acquisition request reception means, HTML document data signaling means for signaling, when it is analyzed by the acquisition request analysis means that the acquisition request is an acquisition request for HTML document data, the HTML document data, image data signaling means for signaling, when it is analyzed by the acquisition request analysis means that the acquisition in request is an acquisition request for image data coded in accordance with the coding method, and signaling means for transmitting a response to the acquisition request signaled from one of the HTML document data signaling means and the image data signaling means to the terminal equipment through the network control means.

Each of the terminal equipments ,au includes network control means for controlling connection to and data communication with any of the facsimile apparatus over the network, inputting means for inputting an operation instruction to initiate a WWW browser, program execution control means for controlling execution of a program for initiating the WWW browser in response to the operation instruction inputted by the inputting means and display means for displaying the WWW browser executed by the program execution control means.

The WWW server may include network control means for controlling connection to and data communication with any of the facsimile apparatus and the terminal equipments over the network, acquisition request reception means for receiving an acquisition request outputted from any of the terminal equipments, acquisition request analysis means for analyzing the acquisition request received by the acquisition request reception means, decoding program signaling means for signaling, when it is analyzed by the acquisition request analysis means that the acquisition request is an acquisition request for a decoding program for decoding image data decoded in accordance with the coding method, and transmission means for transmitting the decoding program signaled from the decoding program signaling means as a response to the acquisition request to the terminal equipment through the network control means.

According to a still further aspect of the present invention, there is provided an image transfer method for an image transfer system wherein one or more terminal equipments and one or more facsimile apparatus are interconnected by a network, comprising the steps of outputting image data coded in accordance with a unique coding method by and stored in any of the facsimile apparatus to an arbitrary one of the terminal equipments, and outputting a decoding program for decoding image data coded in accordance with the coding method to the terminal equipment in response to a request from the terminal equipment.

Any of the terminal equipments may execute an operation instruction inputting step of inputting an operation instruction to initiate a WWW browser, a program initiation step of initiating a program for the WWW browser in response to the operation instruction inputted by the operation instruction inputting step, a WWW browser display step of displaying the WWW browser initiated by the program initiation step, a URL discrimination step of discriminating whether or not a URL or any of the facsimile apparatus is inputted, a HTML document data acquisition request notification step of sending, when it is discriminated by the URL discrimination step that a URL is inputted, a notification of an acquisition request for HTML document data to that one of the facsimile apparatus which has the URL through the network, a HTML document data reception step of receiving the HTML document data transmitted from the facsimile apparatus in response to the notification of the acquisition request by the HTML document data acquisition request notification step, a HTML document data display step of displaying the HTML document data received by the HTML document data reception step, a program execution description discrimination step of discriminating whether or not a program execution description is present in the HTML document data displayed by the HTML document data display step, a decoding program acquisition request notification step of sending, when it is discriminated by the program execution description discrimination step that the program execution description is present, a notification of an acquisition request for a decoding program to the facsimile apparatus, a decoding program reception step of receiving the decoding program transmitted from the facsimile apparatus in response to the acquisition request notification by the decoding program acquisition request notification step, a decoding program execution step of executing the decoding program received by the decoding program reception step, an image data acquisition request notification step of sending a notification of an acquisition request for image data to the facsimile apparatus, an image data reception step of receiving the image data transmitted from the facsimile apparatus in response to the acquisition request by the image data acquisition request notification step, an image data decoding step of decoding the image data received by the image data reception step based on the decoding program executed by the decoding program execution step, and an image data display step of displaying the image data decoded by the image data decoding step.

Any of the facsimile apparatus may executes a coding step of coding image data included in data inputted to the facsimile apparatus over a public network in accordance with the unique coding method, an image data storage step of storing the image data coded by the coding step, a management step of managing the image data stored by the image data storage step and page information of the image data, an acquisition request reception step of receiving an acquisition request transmitted from any of the terminal equipments over the network, an acquisition request analysis step of analyzing the acquisition request received by the acquisition request reception step, a first discrimination step of discriminating whether or the acquisition request analyzed by the acquisition request analysis step is an acquisition request for HTML document data a HTML document data signaling step of signaling, when it is discriminated by the first discrimination step that the acquisition request is an acquisition request for document data, the HTML document data to the terminal equipment, a second discrimination step of discriminating when it is not discriminated by the first discrimination step that the acquisition request is an acquisition request for document data, whether or the acquisition request is an acquisition request for a decoding program, a decoding program signaling step of signaling, when it is discriminated by the second discrimination step that the acquisition request is an acquisition request for a decoding program, the decoding program to the terminal equipment, a third discrimination step of discriminating, when it is not discriminated by the second discrimination step that the acquisition request is an acquisition request for a decoding program, whether or the acquisition request is an acquisition request for image data, an image data signaling step of signaling, when it is discriminated by the third discrimination step that the acquisition request is an acquisition request for image data, the image data to the terminal equipment, and an error information signaling step of signaling error information when it is not discriminated by the third discrimination step that the acquisition request is an acquisition request for image data.

According to a yet further aspect of the present invention, there is provided an image transfer method for an image transfer system wherein one or more terminal equipments, one or more facsimile apparatus and a WWW server are interconnected by a network, comprising the steps of outputting image data coded in accordance with a unique coding method by and stored in any of the facsimile apparatus to an arbitrary one of the terminal equipments, and outputting, from the WWW server in which a decoding program for decoding image data coded in accordance with the coding method, the decoding program to the terminal equipment in response to a request from the terminal equipment.

Any of the facsimile apparatus may execute a coding step of coding image data included in data inputted to the facsimile apparatus over a public network in accordance with the unique coding method, an image data storage step of staring the image data coded by the coding step, a management step of managing the image data stored by the image data storage step and page information of the image data, an acquisition request reception step of receiving an acquisition request transmitted from any of the terminal equipments over the network, an acquisition request analysis step of analyzing the acquisition request received by the acquisition request reception step, a first discrimination step of discriminating whether or the acquisition request analyzed by the acquisition request analysis step is an acquisition request for HTML document data, a HTML document data signaling step of signaling, when it is discriminated by the first discrimination step that the acquisition request is an acquisition request for HTML document data, the HTML document data to the terminal equipment, a second discrimination step of discriminating, when it is not discriminated by the first discrimination step that the acquisition request is an acquisition request for HTML document data, whether or the acquisition request is an acquisition request for image data, an image data signaling step of signaling, when it is discriminated by the second discrimination step that the acquisition request is an acquisition request for image data, the image data to the terminal equipment, and an error information signaling step of signaling error information when it is not discriminated by the second discrimination step that the acquisition request is an acquisition request for image data.

Any of the terminal equipments may execute an operation instruction, inputting step of inputting an operation instruction to initiate a WWW browser, a program initiation step of initiating a program for the WWW browser in response to the operation instruction inputted by the operation instruction inputting step, a WWW browser display step of displaying the WWW browser initiated by the program initiation step, a URL discrimination step or discriminating whether or not a URL of any or the facsimile apparatus is inputted, a HTML document data acquisition request notification step of sending, when it is discriminated by the URL discrimination step that a URL is inputted, a notification of an acquisition request for HTML document data to that one of the facsimile apparatus which has the URL through the network, a HTML document data reception step of receiving the HTML document data transmitted from the facsimile apparatus in response to the notification of the acquisition request by the HTML document data acquisition request notification step, a HTML document data display step of displaying the HTML document data received by the HTML document data reception step, a program execution description discrimination step of discriminating whether or not a program execution description is present in the HTML document data displayed by the HTML document data display step, a decoding program acquisition request notification step of sending, when it is discriminated by the program execution description discrimination step that the program execution description is present, a notification of an acquisition request for a decoding program to the WWW server, a decoding program reception step of receiving the decoding program transmitted from the WWW server in response to the acquisition request notification by the decoding program acquisition request notification step, a decoding program execution step of executing the decoding program received by the decoding program reception step, an image data acquisition request notification step of sending a notification of an acquisition request for image data to the facsimile apparatus, an image data reception step of receiving the image data transmitted from the facsimile apparatus in response to the acquisition request by the image data acquisition request notification step, an image data decoding step of decoding the image data received by the image data reception step based on the decoding program executed by the decoding program execution step, and an image data display step of displaying the image data decoded by the image data decoding step.

With the image transfer system and the image transfer method, when image conversion is performed so that image data may be outputted from a terminal equipment of an output destination, a hardware resource of a facsimile apparatus of the image transfer system such as a CPU or a RAM is not used. The reason is that a unique coding method used in the facsimile apparatus is passed to the terminal equipment of the output destination together with image data and the terminal equipment performs the image conversion processing. Consequently, since there is no necessity to incorporate hardware for image conversion on the facsimile apparatus side, reduction in cost can be achieved.

Further, with the image transfer system and the image transfer method, no unnecessary load is applied to the network. The reason is such as follows. In particular, while usually most of images received by a facsimile apparatus are binary images of white and black, an image format wherein colors are taken into consideration is sometimes used by a terminal of an output destination. A WWW browser in most cases uses the GIF format or the JPEG format, and when image data is handled with the GIF format, 256 different colors can be included, but when image data is handled with the JPEG format, 16, 670, 700 different colors or more can be included. To convert image data into data of either of the color formats in order to allow handling of an image of binary values to the utmost is to make information redundant, and transfer of an image obtained by such conversion applies a useless load to the network. With the image transfer system and the image transfer method of the present invention, however, since a binary image is transferred to a terminal equipment without converting it into a color image, no unnecessary load is applied to the network, and the transfer time can be reduced when compared with an alternative case wherein a binary image is converted into another image of the GIF format or the JPEG format by the facsimile apparatus side.

The above and other objects, features and advantages of the present invention will become apparent from the following description and the appended claims, taken in conjunction with the accompanying drawings in which like parts or elements are denoted by like reference symbols.

BRIEF DESCRIPTION OF THE DRAWINGS

FIG. 6 is a view showing a HTML document signaled from the facsimile apparatus of FIG. 1;

FIG. 7 is schematic view showing au example of a display when the HTML document shown in FIG. 6 is displayed on the terminal equipment of FIG. 2;

FIG. 8 is a view showing another HTML document signaled from the facsimile apparatus of FIG. 1;

FIG. 9 is a view illustrating an example of a program described in accordance with the Java and used in the facsimile apparatus of FIG. 1 and the terminal equipment of FIG. 2;

FIG. 13 is a view of a HTML document signaled from the facsimile apparatus of FIG. 11.

DESCRIPTION OF THE PREFERRED EMBODIMENTS

First Embodiment

Figure 1:
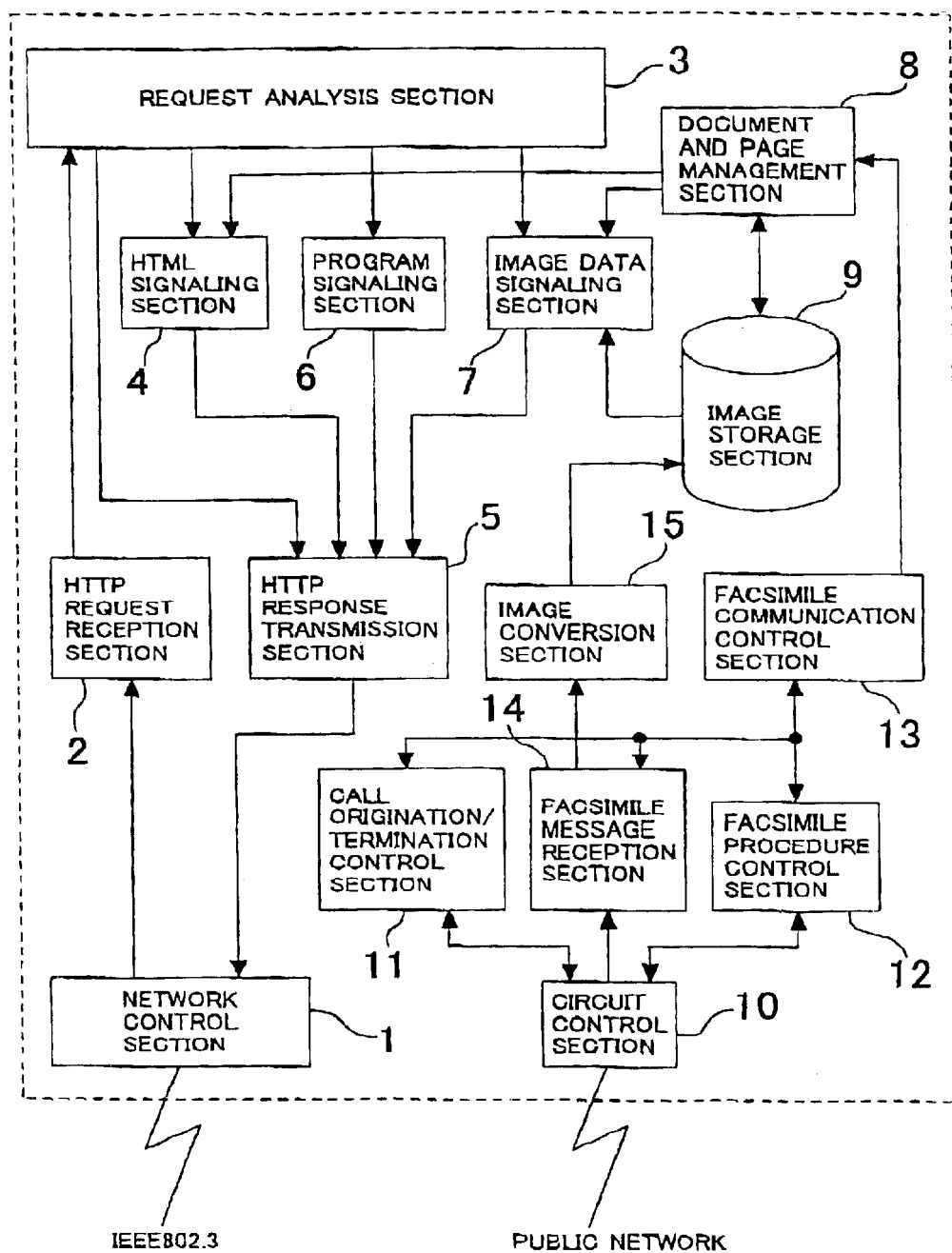
FIG. 1 is a block diagram showing a general construction of a facsimile apparatus of an image transfer system to which the present invention is applied.

Referring first to FIG. 1, there is shown a general construction of a facsimile apparatus of an image transfer system to which the present invention is applied. The facsimile apparatus shown includes a network control section 1, a HTTP request reception section 2, a request analysis section 3, a HTML signaling section 4, a HTTP response transmission section 5, a program signaling section 6, an image data signaling section 7, a document and page management section 8, an image storage section 9, a circuit control section 10, a call origination/termination control section 11, a facsimile procedure control section 12, a facsimile communication control section 13, a facsimile message reception section 14, and an image conversion section 15.

The network control section 1 is physically connected to an ethernet to interface with a LAN (local area network) to realize the TCP/IP protocol. In particular, the network control section 1 operates in accordance with the internet protocol (IP) to provide a service of transferring an IP datagram (a basic unit of information transferred in a TCP/IP network) from a transmission source to a reception destination. Further, the network control section 1 uses an IP datagram a transfer function to provide a transmission control protocol (TCP) and provides a data stream service of high reliability to the HTTP request reception section 2 and the HTTP response transmission section 5.

The HTTP request reception section 2 has a function of receiving and analyzing a request of a client of the HTTP protocol using a service of the TCP/IP protocol by the network control section 1. The HTTP (Hyper Text Transfer Protocol) is a protocol for transferring a file (home page or the like) described with the HTML.

The request analysis section 3 acquires a URL from information obtained from the HTTP request reception section 2 and delivers instructions to the HTML signaling section 4, program signaling section 6 and image data signaling section 7 in response to the URL.

The HTML signaling section 4 signals data described with the HTML and stored in the inside thereof in advance to a PC (personal computer) making use of the HTTP response transmission section 5.

The HTTP response transmission section 5 transmits resulting data responding to a request to a client received by the HTTP request reception section 2 based on an instruction from the HTML signaling section 4, program signaling section 6 or image data signaling section 7 using a service of the TCP/IP protocol by the network control section 1.

The program signaling section 6 signals a "decoding program" held in the inside of the facsimile apparatus in advance to the PC making use of the HTTP response transmission section 5. The "decoding program" is a program which can be executed by a program execution control section 104 of the PC, which is hereinafter described, and is used to decode image data stored in the facsimile apparatus and convert the decoded image data into data of a format which can be utilized by a WWW browser 101 of the terminal (PC) of an output destination which is hereinafter described.

The image data signaling section 7 acquires information of documents and information of pages which compose the documents from the document sad page management section 8 and acquires image data from the image storage section 9, and signals the acquired information and data to the PC making use of the HTTP response transmission section 5.

The document and page management section 8 manages documents stored in the image storage section 9 and information of pages which compose the documents.

The image storage section 9 stores image data obtained by facsimile reception.

The circuit control section 10 connects the facsimile apparatus to a public network and has a function as a control section and another function as a modem. The circuit control section 10 thus converts an analog signal on the circuit into a digital signal which is handled in the facsimile apparatus and vice versa.

The call origination/termination control section 11 controls the circuit control section 10 to control origination or termination of a call.

The facsimile procedure control section 12 controls the circuit control section 10 to control a procedure signal so that a facsimile procedure may be performed in accordance with the ITU-T30 recommendations, and executes the phases A, B, D and E.

The facsimile communication control section 13 controls the call origination/termination control section 11, facsimile procedure control section 12 and facsimile message reception section 14 to control the entire facsimile procedure and notifies the document and page management section 8 of document information and page information of a received document.

The facsimile message reception section 14 controls the circuit control section 10 to receive image data sent thereto from the other party machine and pass the image data to the image conversion section 25. Further, the facsimile message reception section 14 executes the phase C of the ITU-T30 recommendations.

The image conversion section 15 decodes image data received by the facsimile message reception section 14 in accordance with a facsimile coding method, codes the decoded image data in accordance with a coding method suitable for storage in the inside of the facsimile apparatus, and stores the coded image data into the image storage section 9.

Figure 2:
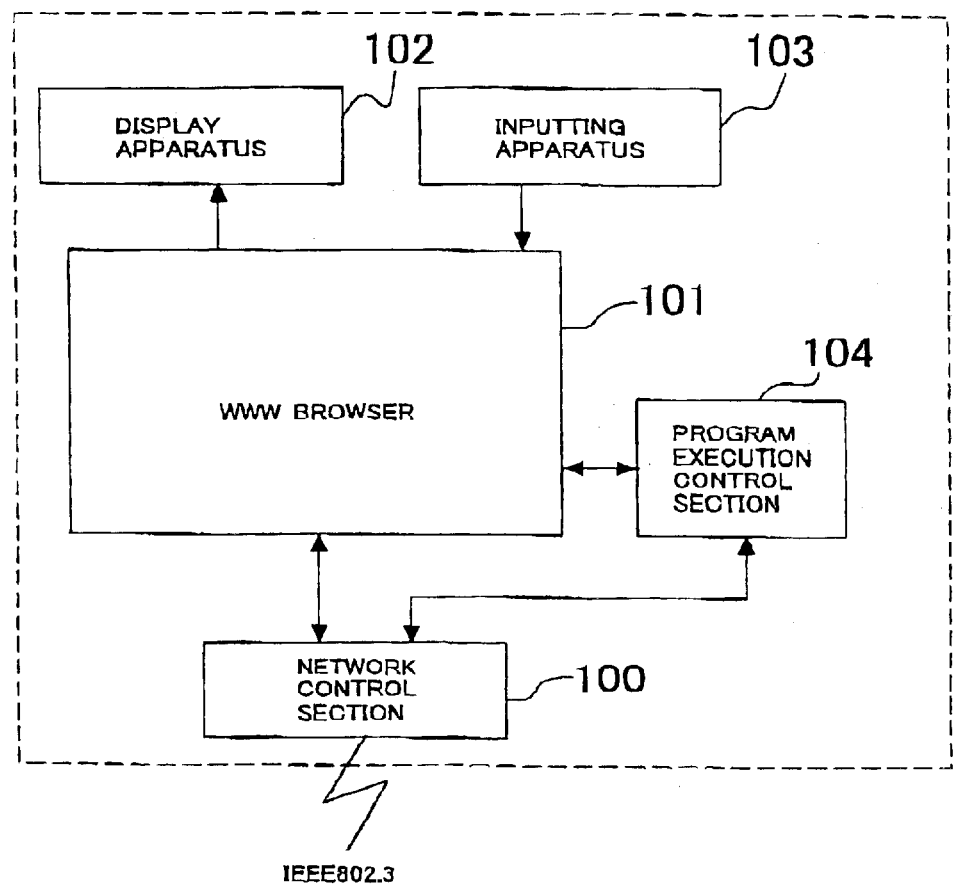
FIG. 2 is a block diagram showing a general construction of a terminal equipment of the image transfer system to which the present invention is applied

FIG. 2 shows a general construction of a terminal equipment of the image transfer system to which the present invention is applied. The terminal equipment is used as an output destination of the facsimile apparatus described hereinabove with reference to FIG. 1 and principally includes a network control section 100, a WWW browser 101, a display apparatus 102, an inputting apparatus 103 and a program execution control section 104.

The terminal equipment described may be a personal computer, a workstation or a like apparatus. In the following description, a terminal equipment which may be any of the apparatus mentioned is generally referred to as PC.

The network control section 100 in the PC of FIG. 2 has functions similar to those of the network control section 1 of the facsimile apparatus described hereinabove with reference to FIG. 1 and includes the TCP/IP protocol.

The WWW browser 101 is a World Wide Web (WWW) browser which operates on the PC and can read a home page on the Internet.

The display apparatus 102 is a display unit for displaying a WWW browser initiated and HTML document data, image data or the like acquired by the PC.

The inputting apparatus 103 is an inputting device such as a keyboard, a mouse or the like to be used to input an operation instruction for initiating the WWW browser or to input a URL or the like.

The program execution control section 104 is a JVM (Java Virtual Machine) and has a function of executing a "decoding Java Applet" received by the facsimile apparatus on the WWW browser 101.

The facsimile apparatus and the PC in the image transfer system to which the present invention is applied are connected to a local area network (LAN) over an ethernet IEEE802.3. Further, the facsimile apparatus is connected at the circuit control section 10 thereof to a public network over an analog circuit.

In the image transfer system, the "decoding program" is an Applet programmed with the Java and converted into byte codes. The program execution control section 104 is a JVM (Java Virtual Machine).

The Java is a program development language published in 1995 by Sun Microsystems of the U.S., and codes produced by compiling a program described with the Java are called byte codes, Further particularly byte codes for being downloaded from a network so as to be executed on a WWW browser is called Applet. The Applet can operate platform-independently, that is, without any limitation to an OS to be used. Recent WWW browsers usually incorporate a JVM. The JVM is an interpreter of byte codes and the Applet is allowed to operate with the JVM. Accordingly, in such an environment that a WWW browser operates, also an Applet can operate. In the following description, a "decoding program" is referred to as "decoding Java Applet".

Now, operation of the image transfer system is described with reference to FIGS. 1 and 2. It a user initiates the WWW browser 101, then a notification of an acquisition request for a HTML document is sent through the network control section 100 on the output destination terminal side and the network control section 1 on the facsimile apparatus side. When the request analysis section 3 detects the acquisition request through the HTTP request reception section 2, a HTML document is transmitted to the WWW browser 101 by the HTML signaling section 4. The HTML document transmitted may include a description for requesting the facsimile apparatus side for a decoding program, and if the WWW browser 101 finds out the description when the HTML document is displayed, then it issues an acquisition request for a decoding program. If the request analysis section 3 detects the acquisition request, then the program signaling section 6 transmits the decoding program to the WWW browser 101. When the WWW browser 101 receives the decoding program, the program execution control section 104 executes the decoding program. The decoding program executed is so programmed as to request the facsimile apparatus side for image data, and consequently, an acquisition request for image data is issued based on the decoding program. If the request analysis section 3 detects the acquisition request, then the image data signaling section 7 acquires the image data stored in the document and page management section 8 and transmits the image data. The decoding program receives the image data and performs decoding of the image data to convert the image data into data of a format with which the data can be displayed on the WWW browser 101 so that a displaying operation of the image data may be performed.

While usually a facsimile apparatus holds a stored image in a coded form in order to save its capacity, since it is not designed so that it can be utilized only by a terminal of an output destination, such a coding method that data obtained by the coding method can be decoded by the output destination terminal may not necessarily be adopted by the facsimile apparatus. Accordingly, in the case just described, image conversion must be performed so that the image can be utilized by the output destination terminal. However, in order to realize this, hardware resources such as a CPU and a memory must be used.

In contrast, with the image transfer system to which the present invention is applied, it is possible to transfer data while it has a code format used in the facsimile apparatus and decode the data on an output destination terminal (PC) without installing a driver for exclusive use in the output destination terminal, and it is possible to convert the data into data of a format with which the data can be utilized by the output destination terminal (PC) without using hardware resources in the facsimile apparatus for image conversion.

Example of Operation of the First Embodiment

Figure 3:
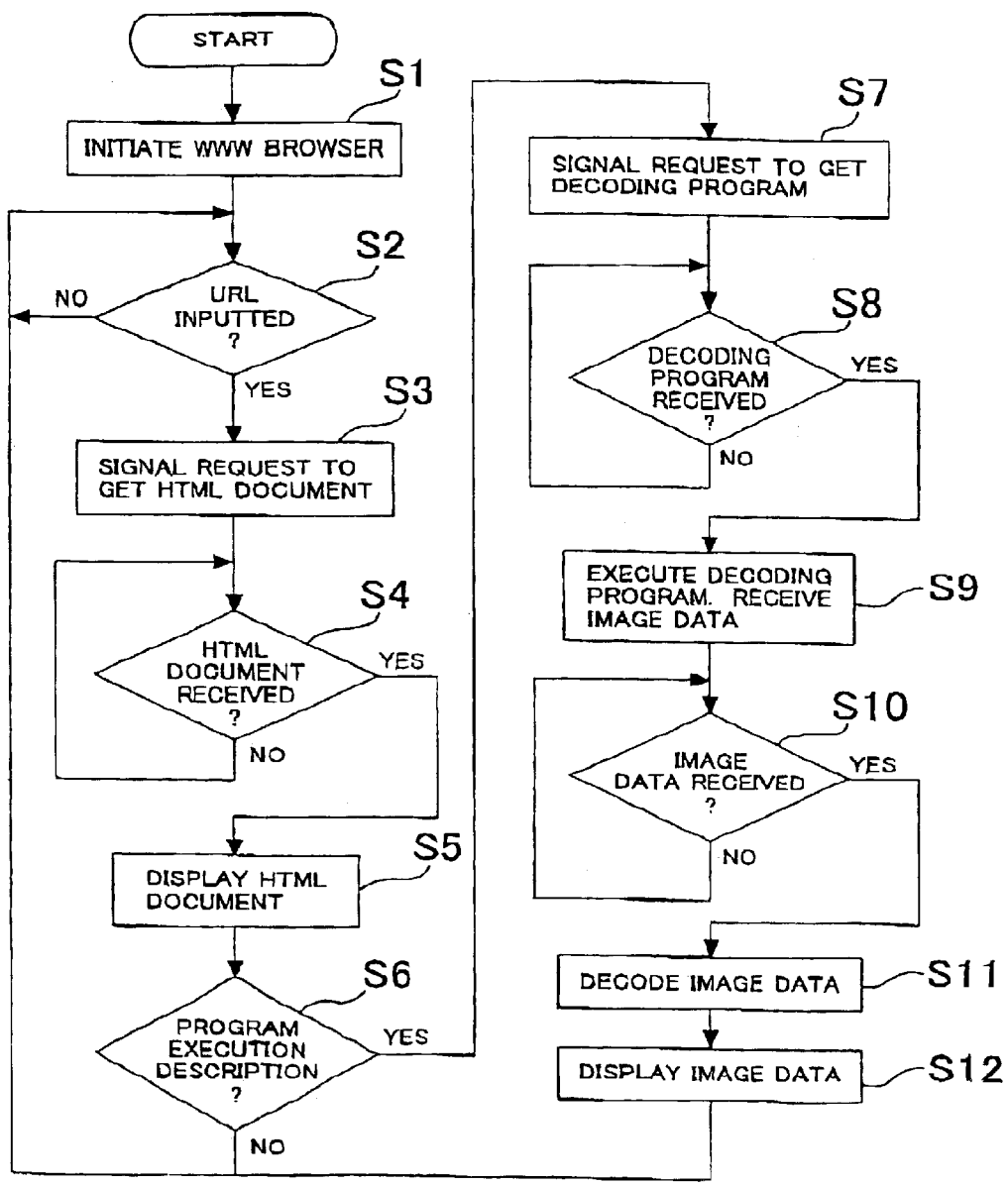
FIG. 3 is a flow chart illustrating processing operation of the terminal equipment of FIG. 2.

In the following, an example of operation of the image transfer system described above is described with reference to FIGS. 3 to 5.

First, a user will operate the inputting apparatus 103 to initiate the WWW browser 101 on the PC (step S1).

The WWW browser 101 initiated causes the display apparatus 102 to perform a displaying operation of the WWW browser. Immediately after the initiation of the WWW browser, a home page of a default URL is displayed, and a waiting condition for inputting of a URL from a user is entered. Thus, it is discriminated whether or not a URL is inputted (step S2).

If a URL of a desired facsimile apparatus is inputted by the user in step S2, then the WWW browser 101 establishes a connection to a facsimile apparatus of the URL through the network control section 100 and signals an acquisition request (GET) for a HTML document in accordance with the HTTP protocol. The request from a client of the HTTP has the following basic structure:

Request method URL HTTP version

Header . . .

For the request method, such methods as GET, HEAD, POST, PUT, DELETE and so forth are defined, and in order only to display a home page without doing a special operation, GET is used in almost all cases. Also in the example of operation of the image transfer system, only GET is used.

After the WWW browser 101 establishes a connection to the facsimile apparatus over the network in such a manner as described above, it signals the following acquisition request (step S3) (sequence Q1):

GET/HTTP/1.0

Header-

The HTTP request reception section 2 of the facsimile apparatus uses the network control section 1 to wait for connection and reception of the request method GET (acquisition request) from a client (step S21) If the network is connected and GET is received, then the HTTP request reception section 2 notifies the request analysis section 3 of the URL.

When the notification of the URL is received from the HTTP request reception section 2, the request analysis section 3 performs analysis of the URL (step S22). The request analysis section 3 recognizes that the URL is "/" and discriminates that the URL is a request for a HTML document (step S23). Consequently, the request analysis section 3 requests the HTML signaling section 4 for signaling of a HTML document.

The HTML signaling section 4 accesses the document and page management section 8 to acquire document information (reception data, the other party of the communication, the number of pages, and so forth) of a facsimile reception document stored already in the document and page management section 8, converts the information into data of the HTML format and signals the data to the HTTP response transmission section 8. The HTTP response transmission section 5 transmits the data to the PC using the network control section 1 and then disconnects the network (step S24) (sequence Q2).

The HTML document signaled in this instance is such as illustrated in FIG. 6. The WWW browser 101 which has waiting for reception of a HTML document receives the HTML document (step S4), and displays the received HTML document in such a manner as seen in FIG. 7 (step S5). Since a link is set for each page of each document, an underline is applied to each page number. If the user moves the cursor of the mouse to one of the underlined page numbers and then clicks, then the WWW browser 101 performs operation similar to that when a URL set as a link is inputted. Thus, the WWW browser 101 establishes a connection to the facsimile apparatus over the network and signals the following acquisition request (sequence Q3):

GET/XXXX-YYYY-view.html HTTP/1.0

Header . . .

(XXXX represents a document number, and YYYY represents a page number.)

The request analysis section 3 of the facsimile apparatus performs similar processing to that described hereinabove. Thus, the request analysis section a receives a notification of the URL"/XXXX-YYYY-view.html" from the HTTP request reception section 2, discriminates that the URL is an acquisition request for a HTML document and requests the HTML signaling section 4 for signalling of a HTML document.

The HTML signaling section 4 produces a HTML document illustrated in FIG. 8, signals the HTML document to the PC and then disconnects the network (sequence Q4).

In the HTML document illustrated in FIG. 8, such an "Applet" tag as to initiate "decoding Java Applet" view.class using the document number XXXX and the page number YYYY is described.

When the WWW browser 101 displays the received HTML document, if it detects an "Applet" tag (step S6), then in order to perform an operation of downloading the "decoding Java Applet" view.class, it establishes a connection to the facsimile apparatus over the network and signals the following acquisition request (step S7) (sequence Q5):

GET/view.class HTTP/1.0

Header . . .

When the request analysis section 3 of the facsimile apparatus receives the notification of the URL "/view.class" from the HTTP request reception section 2, it discriminates that the URL is a request for a decoding program (step S25) and requests the program signaling section 6 for signaling of the program.

The program signaling section 6 signals the data of byte codes of the "decoding Java Applet" view.class held therein in advance to the PC and then disconnects the network (step S26) (sequence Q6).

The WWW browser 101 waits for reception of an Applet (step S8), and when it receives the "decoding Java Applet" view.class, the WWW browser 101 passes it to the program execution control section 104 which is a JVM.

As seen in FIG. 9 which illustrates an outline or a program described with the Java, the program is so programmed as to acquire image data using a document number and a page number of input parameters. The "decoding Java Applet"

executed on the program execution control section 104 establishes a connection to the facsimile apparatus over the network and signals the following acquisition request in order to acquire image data of the pertaining document number and page number (step S9) (sequence Q7).

GET/XXXX-YYYY-pix.data HTTP/1.0

Header . . .

When the request analysis section 3 of the facsimile apparatus receives the notification of the URL "/XXXX-YYYY-pix.data" from the HTTP request reception section 2, it discriminates that the URL is a request for image data (step S27) and requests the program signaling section 6 for signaling of the image data.

The image data signaling section 7 accesses the document and page management section 8 to acquire a corresponding file name, acquires image data of the corresponding page from the image storage section 9, signals the image data to the PC, and then disconnects the network (step S28) (sequence Q8).

Figure 10:
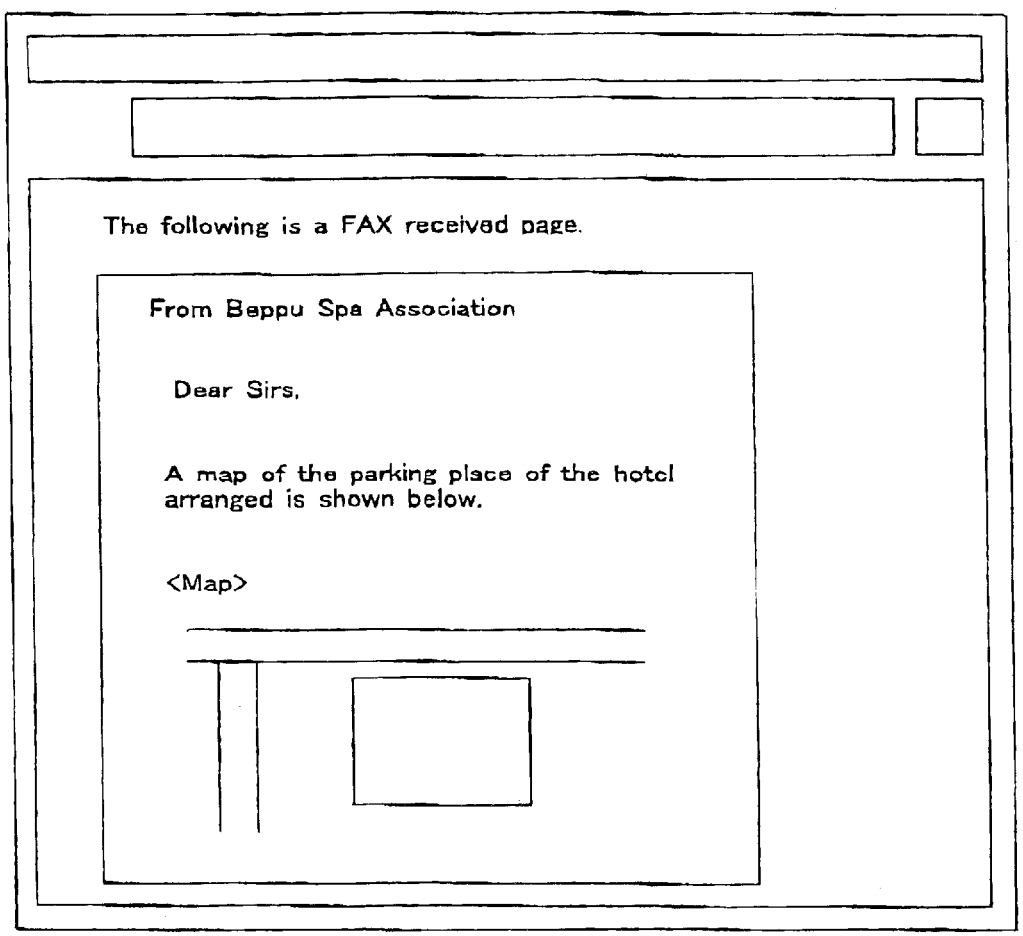
FIG. 10 is a schematic view showing an example of a display when a HTML document including image data processed by the facsimile apparatus of FIG. 1 is displayed on the terminal equipment of FIG. 2.

The "decoding Java Applet" executed on the program execution control section 104 waits for reception of image data (step S10), and performs, when the image data is received, decoding of the image data/in accordance with the known coding method of the facsimile apparatus (step S11). Then, the image data is displayed on the WWW browser 101 (step S12). FIG. 10 shows contents of the page displayed by the processing described above.

Second Embodiment

Subsequently, another image transfer system to which the present invention is described in detail.

In the image transfer system according to the present embodiment, a facsimile apparatus; a WWW server and a terminal equipment (PC) are interconnected by a network. In particular, the facsimile apparatus, WWW server and PC are connected to a local area network (LAN) by the ethernet IEEE802.3. Further, the facsimile apparatus is connected to a public network by an analog circuit.

Figure 11:
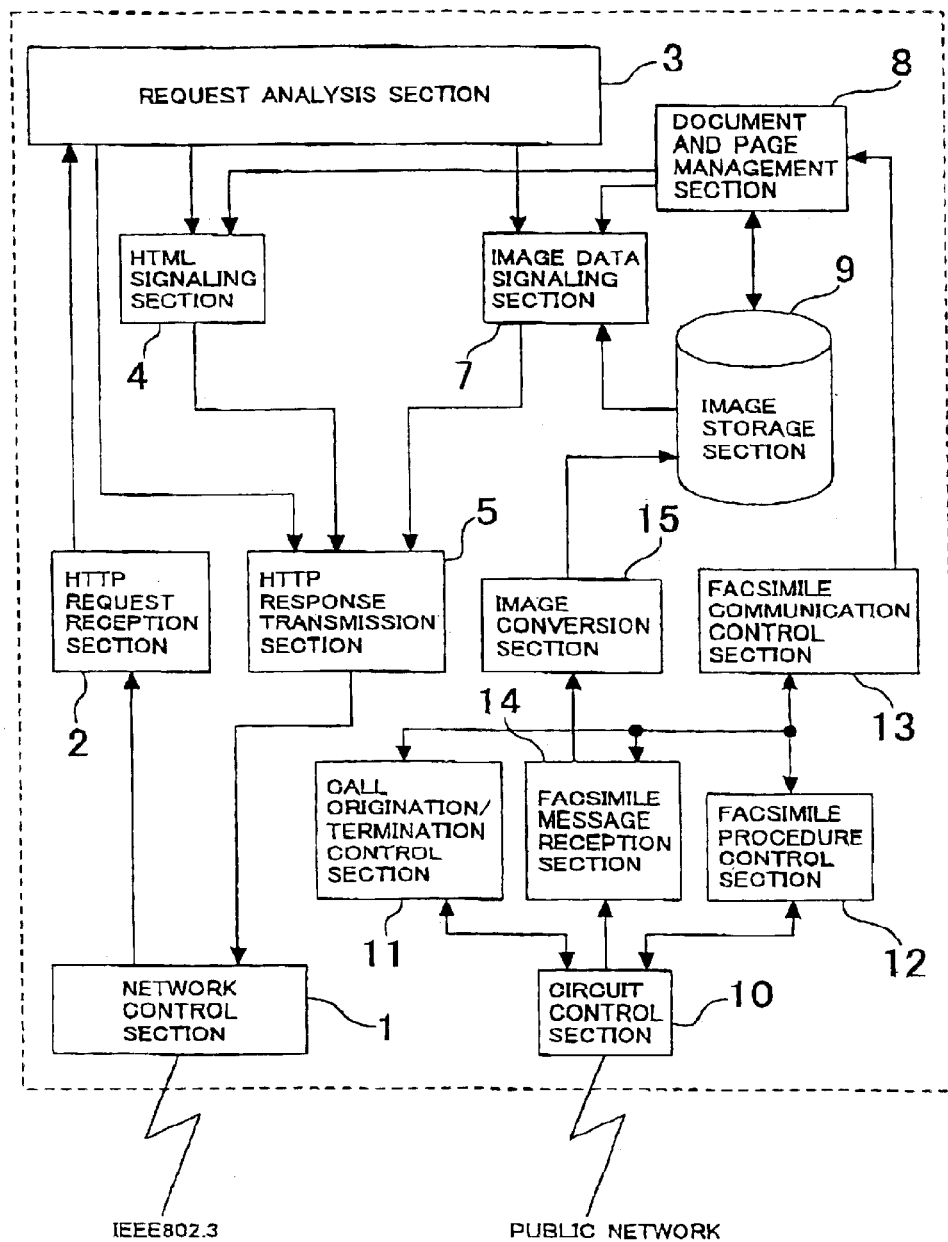
FIG. 11 is a block diagram showing a general construction of a facsimile apparatus of a second image transfer system to which the present invention is applied.

FIG. 11 shows a general construction or the facsimile apparatus of the image transfer system according to the second embodiment of the present invention. Referring to FIG. 11, the facsimile apparatus shown includes a network control section 1, a HTTP request reception section 2, a request analysis section 3, a HTML signaling section 4, a HTTP response transmission section 5, an image data signaling section 7, a document and page management section 8, an image storage section 9, a circuit control section 10, a call origination/termination control section 11, a facsimile procedure control section 12, a facsimile communication control section 13, a facsimile message reception section 14, and an image conversion section 15. The facsimile apparatus described is different from the facsimile apparatus described hereinabove with reference to FIG. 1 in that it does not include the program signaling section 6.

Figure 12:
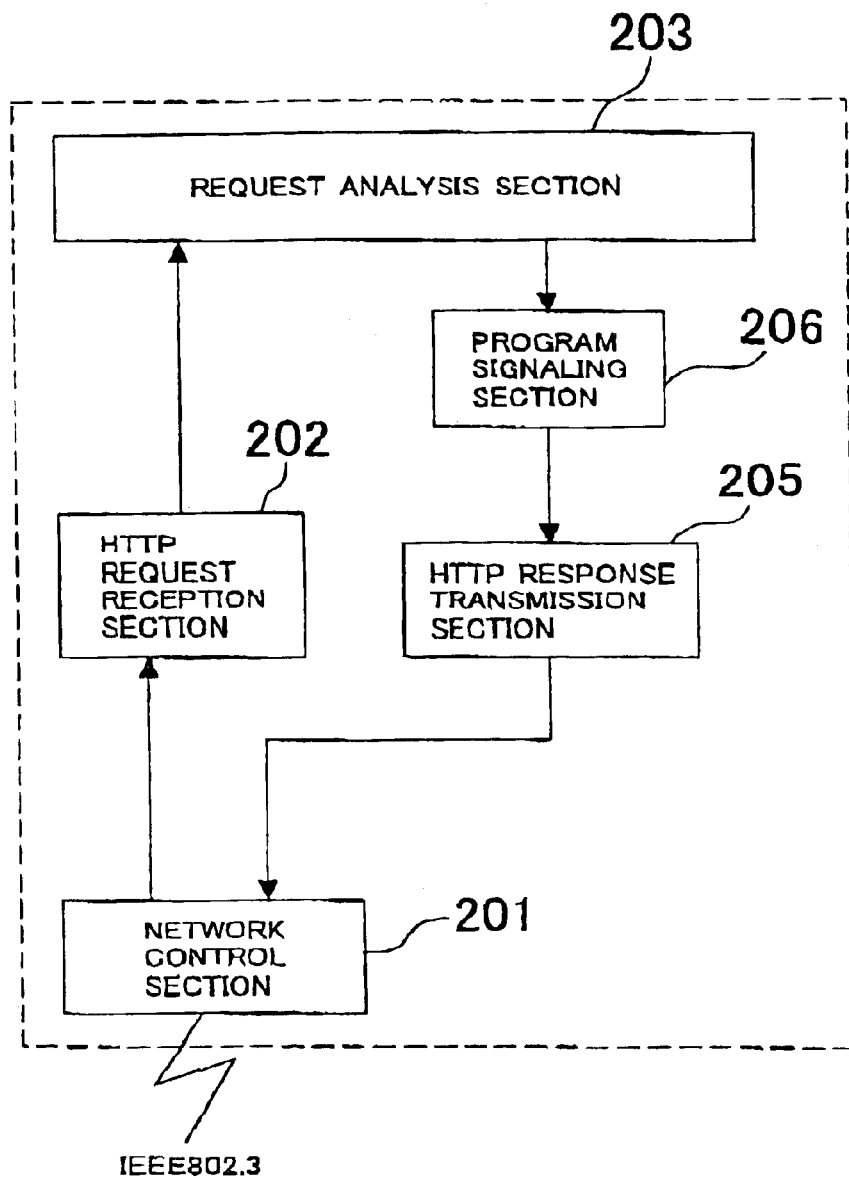
FIG. 12 is a block diagram showing a general construction of a terminal equipment of the second image transfer system.

Meanwhile, a general construction of the WWW server is shown in FIG. 12. Referring to FIG. 12, the WWW server shown includes a network control section 201, a HTTP request reception section 202, a request analysis section 203, a HTTP response transmission section 205, aid a program signaling section 206. Thus, it can be seen that the function of transferring a "decoded Java Applet" of the facsimile apparatus show in FIG. 1 is not installed in the facsimile apparatus described above with reference to FIG. 11 but installed in such a WWW server as shown in FIG. 12.

Figure 4:
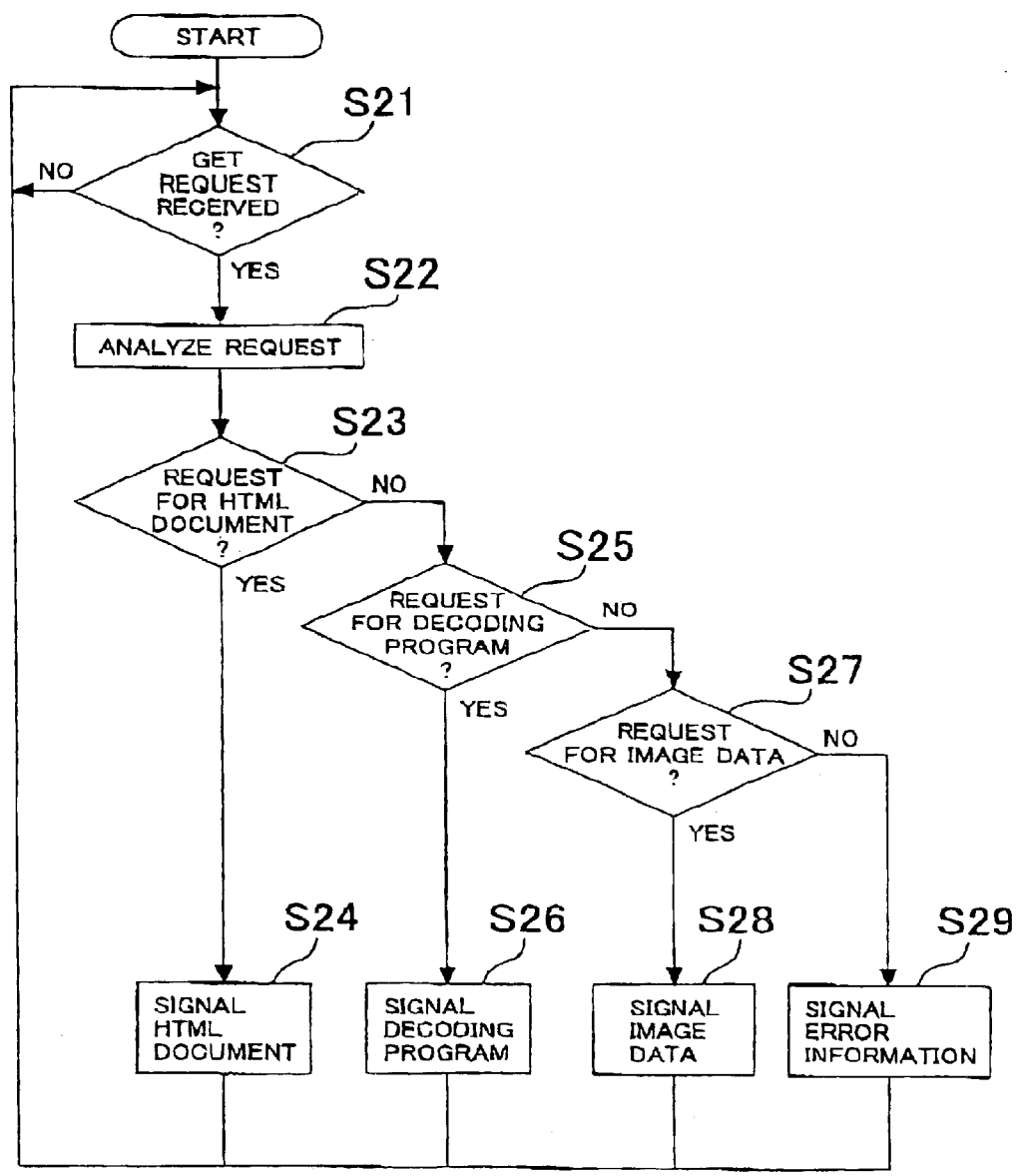
FIG. 4 is a flow chart illustrating processing operation of the facsimile apparatus or FIG. 1.
Figure 5:
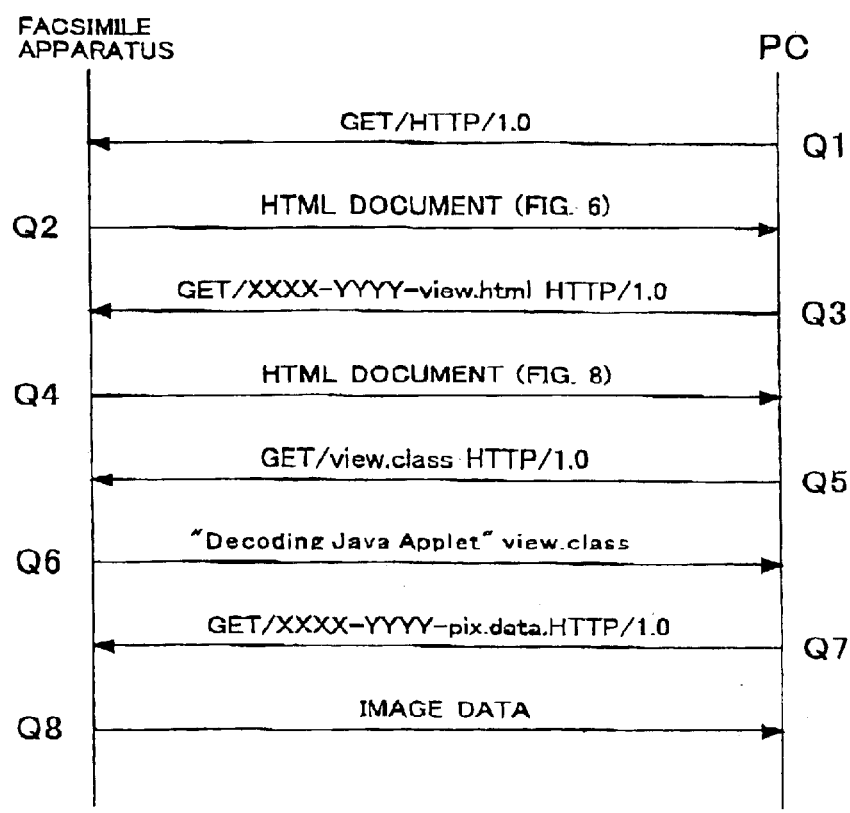
FIG. 5 is a sequence diagram illustrating an example of operation of the facsimile apparatus of FIG. 1 and the terminal equipment of FIG. 2.

The individual components operate in a similar manner as in the facsimile apparatus of the first embodiment described hereinabove. Further, the facsimile apparatus of FIG. 11 generally operates similarly to the facsimile apparatus of FIG. 1 in accordance with the flow chart of FIG. 4 except that the processing in steps S25 and S26 of the flow chart of FIG. 4 is executed by the WWW server of FIG. 12. Particularly, the operations of the facsimile apparatus in steps S25 and S26 of FIG. 4 are replaced by the following operations of the WWW server.

When the WWW browser 101 displays a received HTML document, if it finds out an "Applet" tag (step 36), then in order to perform an operation of downloading the "decoding Java Applet" view.class, the WWW browser 101 establishes a connection to the WWW server and signals the following acquisition request (step S7):

GET/view.class HTTP/1.0

Header . . .

The request analysis section 203 of the WWW sever discriminates, when it receives the notification of the URL "/view.class" through the network control section 201 and the HTTP request reception section 202, that the URL is a request for the decoding program stop S25) and requests the program signaling section 206 to signal the program.

The program signaling section 206 signals data of byte codes of the "decoding Java Applet" view.class held therein in advance to the PC and then disconnects the network (step S26).

FIG. 13 shows a HTML document which is a partial modification to the HTML document shown in FIG. 8. As seen from FIG. 13, only by changing the description of the URL of the WWW server at the location of "CODEBASE=", the designation can be changed so that the "decoding" Java Applet" be downloaded not from the facsimile apparatus but from the WWW server.

With the image transfer system of the second embodiment of the present invention, by incorporating the program signaling section 206 not in the facsimile apparatus but in the WWW server different from the facsimile apparatus, the following effects can be anticipated.

First, since the "decoding Java Applet" for image conversion is not incorporated in the facsimile apparatus, the area of a HOM of the facsimile apparatus for storing it (or a storage device such as a hard disk) is not necessitated, and consequently, a hardware resource for image conversion can be further reduced. Further, since the anticipated operation is achieved with a single WWW server provided for a plurality of facsimile apparatus, reduction of the total cost can be anticipated.

Further, when an additional function is to be provided to the "decoding Java Applet" or in a like case, since stored contents of a storage device of the facsimile apparatus body such as a RON need not be changed but it is only required to update only stored contents of the WWW server, the convenience to a user can be augmented.

While preferred embodiments of the present invention have been described using specific terms, such description is for illustrative purposes only, and it is to be understood that changes and variations may be made without departing from the spirit or scope of the following claims.

What is claimed is:

1. An image transfer method for an image transfer system wherein one or more terminal equipments and one or more facsimile apparatus are interconnected by a network, comprising the steps of:

outputting image data coded in accordance with a unique coding method by and stored in any of said facsimile apparatus to an arbitrary one of said terminal equipments; and outputting a decoding program for decoding image data coded in, accordance with the coding method to the terminal equipment in response to a request from the terminal equipment, wherein any of said terminal equipments executes:

an operation instruction inputting step of inputting an operation instruction to initiate a WWW browser;

a program initiation step of initiating a program for the WWW browser in response to the operation instruction inputted by the operation instruction inputting step;

a WWW browser display step of displaying the WWW browser initiated by the program initiation step;

a URL discrimination step of discriminating whether or not a URL of any of said facsimile apparatus is inputted;

a HTML document data acquisition request notification step of sending, when it is discriminated by the URL discrimination step that a URL is inputted, a notification of an acquisition request for HTML document data to that one of said facsimile apparatus which has the URL through said network;

a HTML document data reception step of receiving the HTML document data transmitted from the facsimile apparatus in response to the notification of the acquisition request by the HTML document data acquisition request notification step;

a HTML document data display step of displaying the HTML document data received by the HTML document data reception step;

a program execution description discrimination step of discriminating whether or not a program execution description is present in the HTML document data displayed by the HTML document data display step;

a decoding program acquisition request notification step of sending when it is discriminated by the program execution description discrimination step that the program execution description is present, a notification of an acquisition request for a decoding program to the facsimile apparatus;

a decoding program reception step of receiving the decoding program transmitted from the facsimile apparatus in response to the acquisition request notification by the decoding program acquisition request notification step;

a decoding program execution step of executing the decoding program received by the decoding program reception step;

an image data acquisition request notification step of sending a notification of an acquisition request for image data to the facsimile apparatus;

an image data reception step of receiving the image data transmitted from the facsimile apparatus in response to the acquisition request by the image data acquisition request notification step;

an image data decoding step of decoding the image data received by the image data reception step based on the decoding program executed by the decoding program execution step; and an image data display step of displaying the image data decoded by the image data decoding step.

2. An image transfer method as claimed in claim 1, wherein any of said facsimile apparatus executes:

a coding step of coding image data included in data inputted to the facsimile apparatus over a public network in accordance with the unique coding method;

an image data storage step of storing the image data coded by the coding step;

a management step of managing the image data stored by the image data storage step and page information of the image data;

an acquisition request reception step of receiving an acquisition request transmitted from any of said terminal equipments over said network;

An acquisition request analysis step of analyzing the acquisition request received by the acquisition request reception step;

a first discrimination step or discriminating whether or the acquisition request analyzed by the acquisition request analysis step is an acquisition request for HTML document data;

a HTML document data signaling step of signaling, when it is discriminated by the first discrimination step that the acquisition request is an acquisition request for HTML document data, the HTML document data to the terminal equipment;

a second discrimination step of discriminating, when it is not discriminated by the first discrimination step that the acquisition request is an acquisition request for HTML document data, whether or not the acquisition request is an acquisition request for a decoding program;

a decoding program signaling step of signaling, when it is discriminated by the second discrimination step that the acquisition request is an acquisition request for a decoding program, the decoding program to the terminal equipment;

a third discrimination step of discriminating, when it is not discriminated by the second discrimination step that the acquisition request is an acquisition request for a decoding program, whether or not the acquisition request is an acquisition request for image data;

an image data signaling step of signaling, when it is discriminated by the third discrimination step that the acquisition request is an acquisition request for image data, the image data to the terminal equipment; and an error information signaling step of signaling error information when it is not discriminated by the third discrimination step that the acquisition request is an acquisition request for image data.

3. An image transfer method for an image transfer system wherein one or more terminal equipments and one or more facsimile apparatus are interconnected by a network, comprising the steps of:

outputting image data coded in accordance with a unique coding method by and stored in any of said facsimile apparatus to an arbitrary one of said terminal equipments; and outputting a decoding program for decoding image data coded in accordance with the coding method to the terminal equipment in response to a request from the terminal equipment, wherein any of said facsimile apparatus executes:

a coding step of coding image data included in data inputted to the facsimile apparatus over a public network in accordance with the unique coding method;

an image data storage step of storing the image data coded by the coding step;

a management step of managing the image data stored by the image data storage step and page information of the image data;

an acquisition request reception step of receiving an acquisition request transmitted from any of said terminal equipments over said network;

an acquisition request analysis step of analyzing the acquisition request received by the acquisition request reception step;

a first discrimination step of discriminating whether or not the acquisition request analyzed by the acquisition request analysis stop is an acquisition request for HTML document data;

a HTML document data signaling step of signaling, when it is discriminated by the first discrimination step that the acquisition request is an acquisition request for HTML document data, the HTML document data to the terminal equipment;

a second discrimination step of discriminating, when it is not discriminated by the first discrimination step that the acquisition request is an acquisition request for HTML document data, whether or not the acquisition request is an acquisition request for a decoding program;

a decoding program signaling step of signaling, when it is discriminated by the second discrimination step that the acquisition request is an acquisition request for a decoding program, the decoding program to the terminal equipment;

a third discrimination step of discriminating, when it is not discriminated by the second discrimination step that the acquisition request is an acquisition request for a decoding program, whether or not the acquisition request is an acquisition request for image data;

an image data signaling step of signaling, when it is discriminated by the third discrimination step that the acquisition request is an acquisition request for image data, the image data to the terminal equipment; and an error information signaling step of signaling error information when it is not discriminated by the third discrimination step that the acquisition request is an acquisition request for image data.

4. An image transfer method for an image transfer system wherein one or more terminal equipments, one or more facsimile apparatus and a WWW server are interconnected by a network, comprising the steps of:

outputting image data coded in accordance with a unique coding method by and stored in any of said facsimile apparatus to a requesting one of said terminal equipments; and outputting, from said WWW server in which a decoding program for decoding image data coded in accordance with the coding method, the decoding program to the terminal equipment in response to a request from the requesting terminal equipment, wherein any of said facsimile apparatus executes:

a coding step of coding image data included in data inputted to the facsimile apparatus over a public network in accordance with the unique coding method;

an image data storage step of storing the image data coded by the coding step;

a management step of managing the image data stored by the image data storage step and page information of the image data;

an acquisition request reception step of receiving an acquisition request transmitted from any of said terminal equipments over said network;

an acquisition request analysis step of analyzing the acquisition request received by the acquisition request reception step;

a first discrimination step of discriminating whether or the acquisition request analyzed by the acquisition request analysis step is an acquisition request for HTML document data;

a HTML document data signaling step of signaling, when it is discriminated by the first discrimination step that the acquisition request is an acquisition request for HTML document data, the HTML document data to the terminal equipment;

a second discrimination step of discriminating, when it is not discriminated by the first discrimination step that the acquisition request is an acquisition request for HTML document data, whether or not the acquisition request is an acquisition request for image data;

an image data signaling step of signaling, when it is discriminated by the second discrimination step that the acquisition request is an acquisition request for image data, the image data to the terminal equipment; and an error information signaling step of signaling error information when it is not discriminated by the second discrimination step that the acquisition request is an acquisition request for image data.

5. An image transfer method as claimed in claim 4, wherein any of said terminal equipments executes:

an operation instruction inputting step of inputting an operation instruction to initiate a WWW browser;

a program initiation step of initiating a program for the WWW browser in response to the operation instruction inputted by the operation instruction inputting step;

a WWW browser display step of displaying the WWW browser initiated by the program initiation step;

a URL discrimination step of discriminating whether or not a URL of any of said facsimile apparatus is inputted;

a HTML document data acquisition request notification step of sending, when it is discriminated by the URL discrimination step that a URL is inputted, a notification of an acquisition request for HTML document data to that one of said facsimile apparatus which has the URL through said network;

a HTML document data reception step of receiving the HTML document data transmitted from the facsimile apparatus in response to the notification of the acquisition request by the HTML document data acquisition request notification step;

a HTML document data display step of displaying the HTML document data received by the HTML document data reception step;

a program execution description discrimination step of discriminating whether or not a program execution description is present in the HTML document data displayed by the HTML document data display step;

a decoding program acquisition request notification step of sending, when it is discriminated by the program execution description discrimination step that the program execution description is present, a notification of an acquisition request for a decoding program to said WWW server;

a decoding program reception step of receiving the decoding program transmitted from said WWW server in response to the acquisition request notification by the decoding program acquisition request notification step:

a decoding program execution step of executing the decoding program received by the decoding program reception step;

an image data acquisition request notification step of sending a notification of an acquisition request for image data to the facsimile apparatus;

an image data reception step of receiving the image data transmitted from the facsimile apparatus in response to the acquisition request by the image data acquisition request notification step;

an image data decoding step of decoding the image data received by the image data reception step based on the decoding program executed by the decoding program execution step; and an image data display step of displaying the image data decoded by the image data decoding step.

6. An image transfer method as claimed in claim 5, wherein said decoding program acquisition request notification step only sends the notification of an acquisition request for a decoding program to said WWW server when an Applet tag is determined to be included in the HTML document received by said any of said terminal equipments.

7. An image transfer method as claimed in claim 4, wherein said WWW server executes:

an acquisition request reception step of receiving an acquisition request outputted from any of said terminal equipments over said network;

an acquisition request analysis step of analyzing the acquisition request received by the acquisition request reception step;

a decoding program signaling step of signaling, when it is analyzed by the acquisition request analysis step that the acquisition request is an acquisition request for a decoding program for image data decoded in accordance with the coding method, the decoding program to the terminal equipment; and a transmission step of transmitting the decoding program signaled by the decoding program signaling step as a response to the acquisition request to the terminal equipment.

8. An image transfer method for an image transfer system wherein one or more terminal equipments, one or more facsimile apparatus and a WWW server are interconnected by a network, comprising the steps of:

outputting image data coded in accordance with a unique coding method by and stored in any of said facsimile apparatus to a requesting one of said terminal equipments; and outputting, from said WWW server in which a decoding program for decoding image data coded in accordance with the coding method, the decoding program to the terminal equipment in response to a request from the requesting terminal equipment, wherein any of said terminal equipments executes:

an operation instruction inputting step of inputting an operation instruction to initiate a WWW browser:

a program initiation step of initiating a program for the WWW browser in response to the operation instruction inputted by the operation instruction inputting step;

a WWW browser display step of displaying the WW browser initiated by the program initiation stop;

a URL discrimination step of discriminating whether or not a URL of any of said facsimile apparatus is inputted;

a HTML document data acquisition request notification step of sending, when it is discriminated by the URL discrimination step that a URL is inputted, a notification of an acquisition request for HTML document data to that one of said facsimile apparatus which has the URL through said network;

a HTML document data reception step of receiving the HTML document data transmitted from the facsimile apparatus in response to the notification of the acquisition request by the HTML document data acquisition request notification step;

a HTML document data display step of displaying the HTML document data received by the HTML document data reception step;

a program execution description discrimination step of discriminating whether or not a program execution description is present in the HTML document data displayed by the HTML document data display step;

a decoding program acquisition request notification step of sending, when it is discriminated by the program execution description discrimination step that the program execution description is present, a notification of an acquisition request for a decoding program to said WWW server;

a decoding program reception step or receiving the decoding program transmitted from said WWW server in response to the acquisition request notification by the decoding program acquisition request notification step;

a decoding program execution step of executing the decoding program received by the decoding program reception step;

an image data acquisition request notification step of sending a notification of an acquisition request for image data to the facsimile apparatus;

an image data reception step of receiving the image data transmitted from the facsimile apparatus in response to the acquisition request by the image data acquisition request notification step;

an image data decoding step of decoding the image data received by the image data reception step based on the decoding program executed by the decoding program execution step; and an image data display step of displaying the image data decoded by the image data decoding step.

9. An image transfer method as claimed in claim 8, wherein said WWW server executes:

an acquisition, request reception step of receiving an acquisition request outputted from any of said terminal equipments over said network;

an acquisition request analysis step of analyzing the acquisition request received by the acquisition request reception step;

a decoding program signaling step of signaling, when it is analyzed by the acquisition request analysis step that the acquisition request is an acquisition request for a decoding program for image data decoded in accordance with the coding method, the decoding program to the terminal equipment; and a transmission step of transmitting the decoding program signaled by the decoding program signaling step as a response to the acquisition request to the terminal equipment.

* * * * *